Figure 1:
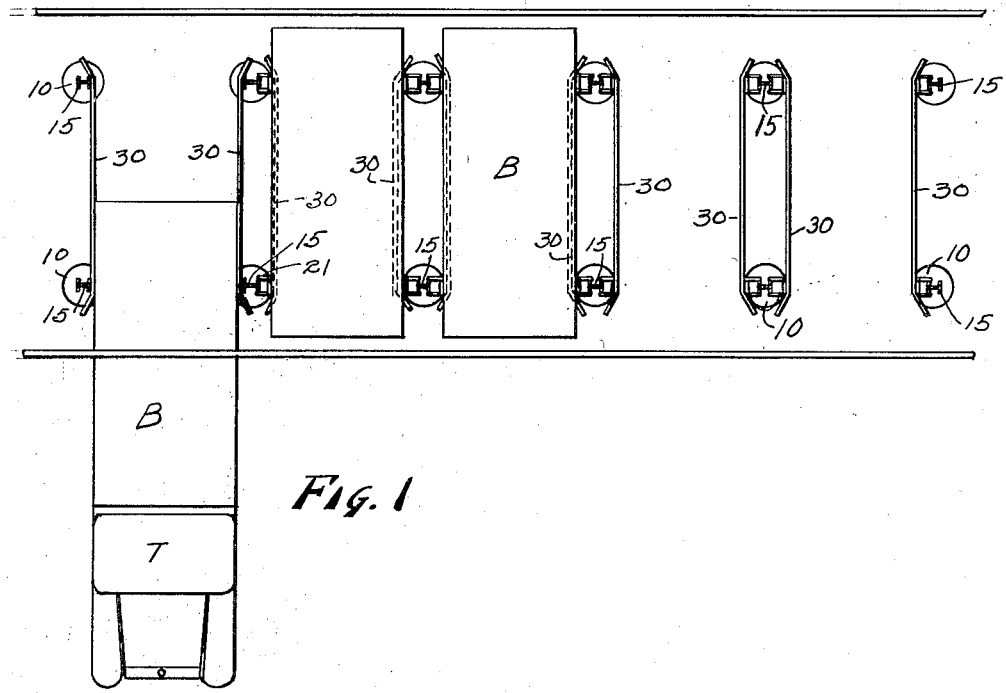

Feb. 2, 1937.   R. A. NORBOM   2,069,267
APPARATUS FOR SUPPORTING DEMOUNTABLE BODIES
Filed June 4, 1934   2 Sheets-Sheet 1

Inventor
Ragnar A. Norbom,
By Davis, Golrick & Teare,
Attorney

Feb. 2, 1937. R. A. NORBOM 2,069,267
APPARATUS FOR SUPPORTING DEMOUNTABLE BODIES
Filed June 4, 1934 2 Sheets-Sheet 2
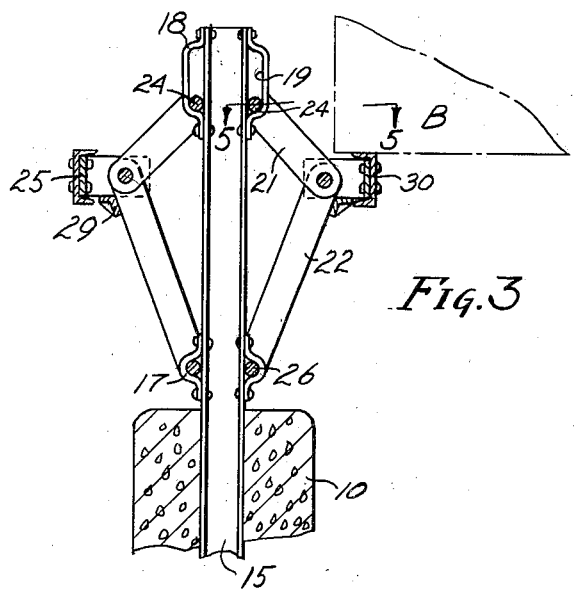
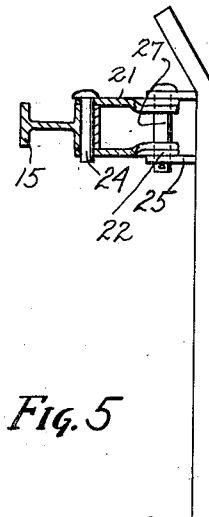
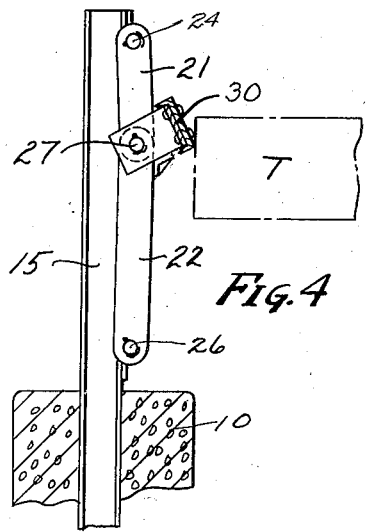
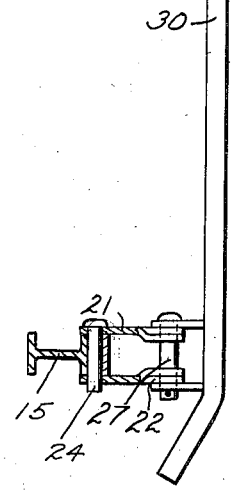

Patented Feb. 2, 1937

2,069,267

UNITED STATES PATENT OFFICE 2,069,267

APPARATUS FOR SUPPORTING DEMOUNTABLE BODIES

Ragnar A. Norbom, Clifton, N. J., assignor to Motor Terminals Company, New York, N. Y., a corporation of Delaware Application June 4, 1934, Serial No. 728,820

14 Claims. (Cl. 248—1)

This invention is concerned with transportation of freight, by means of demountable vehicle bodies which may be transported by highway truck, railway car or by vessel. The present invention is particularly concerned with an apparatus for facilitating storage of such demountable vehicle bodies during periods when they are removed from a transporting conveyance. A crane is provided to handle a demountable body of standard form by engaging hooks thereon, in order that such a demountable body may be easily transported from one vehicle to another, or, if desired, deposited in a suitable storage space until such time as it becomes desirable to transport the body to another location.

Upon arrival at a freight depot, bodies were frequently retained for appreciable intervals of time in the past, either to await the receiving vehicle for the body, or in cases where the consignee of the freight did not promptly call for such goods. Frequently, after the containers had been emptied, they were retained at the freight depot until such time as they were reloaded for transportation to another point.

In the past, it has been common practice to remove such a body from the vehicle and transport it to a suitable storage space where it could remain until such time as it was again needed. This storage space was often provided by merely depositing the demountable body in the entry way vacated by the removal of the vehicle which transported the body to the depot. In such a case, a crane raised the body clear of the vehicle, upon which the latter was withdrawn, the body then being lowered onto wooden "horses" or other supports, placed in the region previously occupied by the vehicle.

Since the horses or other unattached supports could be easily overturned or otherwise improperly positioned, and were not always available, or, in fact, were in the way when present, this latter provision for storage of bodies was not satisfactory. While the bodies could have been deposited directly on the ground or depot floor, such placement was not satisfactory, because there was required an unnecessary lifting operation if the bodies were to be mounted on other vehicles, and an inconvenient unloading operation if they were to be unloaded when so deposited.

An object of my invention has been to overcome the various disadvantages, as set out above, inherent in prior forms of support. A further object of my invention has been to provide removable supports for a demountable body, with means to position the support without the necessity for a workman passing beneath the suspended body.

Another object of my invention has been to provide supports having such characteristics that they may be actively positioned to carry a demountable body, or may be rendered inactive, as desired, in the latter case leaving the entry way unimpeded.

A feature of my invention is to provide a construction such that the supporting means may be rendered inactive automatically, consequent upon the abutment of a vehicle with them.

Many freight depots are provided with a series of entries for vehicles carrying demountable bodies, and having an overhead crane adapted to be moved to stand over any one of such entries. My invention has been adapted to be used in such a freight depot. Between each pair of entries I centrally locate supporting columns adapted to carry vertically displaceable supporting means, which may be moved into position to support a body in one of the entries. Supporting means located on these columns in such a position that they serve one side of an entry are connected together to operate as a unit, at one position being located to support a demountable body thereon, and in another position rendered inactive to permit the passage of a vehicle into the entry way, the two opposite sides of each entry being provided with such vertically displaceable supporting apparatus.

Other features of my invention will become apparent from the specification and the accompanying drawings, the essential novel features being summarized in the claims.

Figure 2:
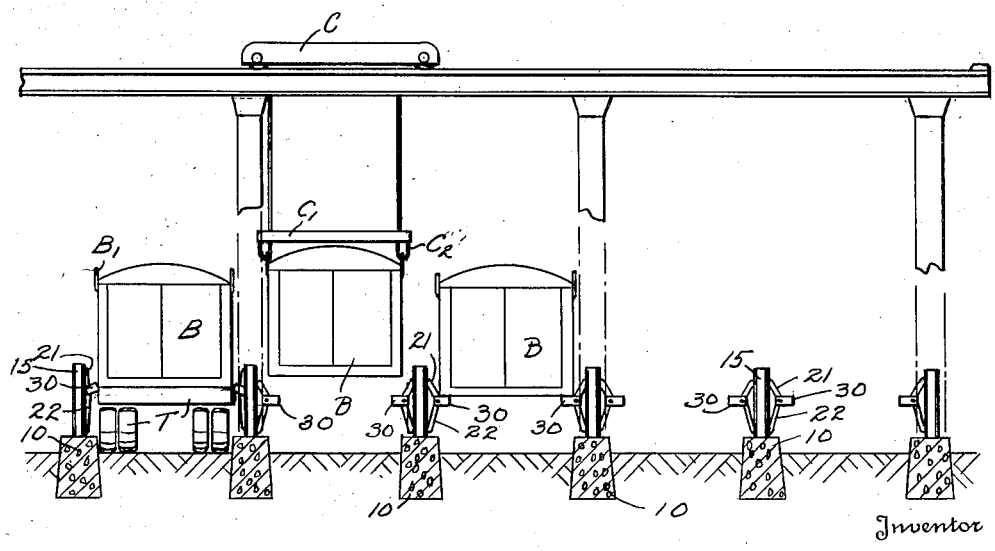

Referring now to the drawings, Fig. 1 is a plan of a freight depot, employing my improved demountable body supporting apparatus. Fig. 2 is a side elevation of a freight depot, showing the body supporting apparatus, both in an active and in an inactive position. Fig. 3 is a sectional view of my device, showing a supporting post with the vertically displaceable toggle brackets thereon. Fig. 4 is a similar section, showing a column with one toggle bracket, the latter being in an inactive position. Fig. 5 is a horizontal section, showing two pillars with their accompanying toggle brackets connected by an intermediate link, as shown by 5—5 of Fig. 3.

Although I have disclosed the present invention as incorporated with an automobile trucking station, it is to be understood that my apparatus may be used with any form of conveyance adapted to carry demountable bodies.

In general my demountable body supporting apparatus may be used in conjunction with a freight terminal, shown in Figs. 1 and 2. A series of parallel entry ways are provided for the admittance of suitable trucks T, which may carry demountable bodies B. An overhead travelling crane C is positioned to serve all the entry ways of the depot. I have shown the crane cables suspending a cradle C' having depending shackles C2 adapted to engage body lift hooks B1, on the demountable body, in order that the crane may lift them from the truck or other support.

In order that flexibility may be provided in the handling of bodies, it is desirable that the crane shall be at a sufficient height to permit it to raise a body high enough to clear a second body deposited on either a truck T, or the supports which are the subject matter of this invention.

I have shown concrete pillars 10 set into or erected on a suitable base (earth or concrete e. g.), the pillars dividing the base surface into adjacent entry ways, and providing firm foundations for the equipment used to support demountable bodies. Firmly embedded in the concrete foundation are suitable supporting posts or columns to carry the toggle brackets which effect the actual supporting of the demountable body. I find it preferable to use a structural H-beam for such supporting column, rigidly mounting one of them in each concrete pillar 10. The H-beam 15 is so embedded in the concrete that the flanges are parallel with the side of adjacent entry ways, thus providing a bearing surface such as will be hereinafter described.

An object of my invention has been to provide body-supporting apparatus in which the carrying members may lie against the supporting columns 15 when inactive, or extend into the entry way to carry a body. I choose to accomplish this result with vertically reciprocable toggle brackets carrying beams on which the body may lie. Each toggle bracket comprises two arm or link members pivoted together at one point, the other end of each member being suitably secured to the supporting column 15.

Each toggle bracket mechanism is pivotally mounted adjacent the bottom of the supporting post 15 and slidable vertically as well as pivotally carried adjacent the top of the post 15. The bottom toggle supporting mechanism is shown as comprising a stirrup 17 riveted or otherwise fastened to the outer face of the flange of the H-member 15. The inner face of this stirrup combines with the registering portion of the flange plate to provide a bearing for a pin to which the bracket is fastened. Adjacent the top of the H-column 15 is a stirrup 18, similar to stirrup 17, but provided with a vertical slideway 19. Thus, the pin supporting the upper portion of the toggle may reciprocate vertically, as well as being supported in the stirrup.

The upper portion of the toggle comprises two members 21, pinned together at their upper ends by a suitable pin 24, which also passes through the slideway 19 of the stirrup 18. A head on one end of the pin and a cotter pin on the other retain it in position. As shown in Fig. 5, the members 21 are placed on opposite sides of the stirrup 18, and are thus separated from each other. The lower members of the toggle bracket are pivotally carried on the H-column 15 adjacent the place where it enters the concrete foundation 10. Two members 22 are supported pivotally on opposite ends of the stirrup 17 by the pin 26, in a manner similar to that employed to maintain the members 21 in active relation with the stirrup 18. As shown in Fig. 5, the stirrups 17 and 18 are equal in width to the end plates of the H-column 15, and thus the ends of each combine to form a bearing surface for the coacting toggle members.

That portion of my supporting apparatus which directly underlies the demountable body, is carried on the lower toggle member 22. A stirrup which is horizontal in the open position shown in Fig. 3 is welded or otherwise fastened to the lower toggle bracket member 22. It should be noted that since the members 21 and 22 have their ends in the same vertical plane adjacent the stirrups 17 and 18, the upper members 21 are bent inwardly, as shown in Fig. 5, to permit the end faces of the two pairs of members to register with each other. A suitable pin 27, having a head at one end and a cotter pin at the other, passes through the members 21 and 22 and the stirrup 25, maintaining them in the relation shown in Fig. 5. To reinforce the welding or other fastening means employed to secure the stirrup 25 to the toggle member 22, an angle bracket 29 is provided on the underside of the stirrup 25. This construction retains the lower toggle member 22 and the stirrup 25 fixed with respect to each other, but permits the toggle to operate with the pivot pin 27 as a hinge.

Secured to the two stirrups 25 on the same side of the entry way is a beam 30 on which the body may rest when the toggles are in their active position. This beam also provides for automatically rendering the device inoperative when a truck enters the entry, as hereinafter explained. This beam may consist of a structural channel member having its channel portion facing the adjacent H-column 15, and having its end flared inwardly toward such H-column, as shown in Fig. 5. The stirrup 25 and the interior width of the channel of the member 30 preferably bear such relation to each other that the stirrup may snugly lie within the channel. As shown, the toggle bracket units on each side of a plurality of H-posts 15 are connected to a respective channel member 30 by means of rivets or other suitable fastenings.

As illustrated in Figs. 1 and 2, when the toggle bracket mechanism is in its active position, the distance between the supporting beams 30 at the opposite sides of the entry way is less than the width of the demountable body B. Hence, such body may be lowered onto these beams and be effectively supported thereby.

When it is desired to render the apparatus automatically inactive, it is merely necessary to back a truck or other vehicle into the entry way. As the truck passes into the entry way, the rear bolster (which has substantially the same dimension transversely of the truck as the body) first engages the flared part of the channel member 30 adjacent the open end of the entry way. Further movement of the truck into the entry way causes a camming action against such flared portion to force the members 30 towards the H-columns 15 supporting them. This movement is possible because the pin 24 in the slideway 19 may move upwardly from the position shown in Fig. 3, to that shown in Fig. 4, at which time the members 30 will be moved out of the way to permit the entrance of the truck, and will bear lightly against the latter, by reason of the horizontal component of their weight. It is apparent that with an apparatus constructed as shown in Fig. 5, the channel 30, and the toggle brackets fastened thereto, must all move simultaneously.

It is to be understood that further modifications of my apparatus may be effected without departing from the spirit of my invention. One such modification involves the use of vertically reciprocable toggle-bracket mechanism to support only one end of the body, and a fixed support to carry the other end. To accomplish this I may employ a pair of vertically reciprocable toggle brackets, respectively on opposite sides of a truck entry adjacent the open end thereof, and a suitable fixed support at the rear end of the entry which might, if desired, act as a bumper to coact with the rear bolster of the truck. Then, after the body is lifted from the truck and the truck removed from the entry way, the pair of toggle brackets automatically actively position themselves by reason of their weight and the body being directly lowered onto the projection or fixed support and the positioned toggle brackets.

With a construction such as that above outlined, it is not necessary to use more than one pair of toggle brackets, and thus, the portion of the channel 30 employed to connect two brackets, may be eliminated. Instead, it is only necessary to provide a flared portion facing the open end of the entry way, to permit the toggle apparatus to be rendered inactive, consequent upon the passage of a truck into the entry way.

It will be seen from the preceding description, that I have provided an effective means for supporting a demountable body within conveyance entry ways, and that I have rendered this supporting apparatus automatic to the extent that the passage of a conveyance into an entry way causes it to be rendered inactive, and does not interfere with the occupancy of the entry by the conveyance.

By practicing my invention, it is also possible to support bodies at the same level as that required of a platform used to unload them when they remain on the conveyance. By mounting the various parts of my supporting apparatus fixedly with respect to the depot platform, there is no time lost through hunting misplaced parts, and danger to workmen is eliminated by avoiding the necessity for passing under the body to locate the supports.

Having thus described my invention, what I claim is:

1. A support for a demountable body which may be automatically rendered inactive, comprising a base, a pair of columns on each side of said base, toggle members pivotally carried on each column, a pair of horizontal beams respectively connecting the toggle members of the two columns on one side of the base whereby said toggle members may move simultaneously, ledges on said beams adapted to support a demountable body, an end of each beam being turned inwardly toward its supporting columns, providing a camming surface, whereby said toggle members may be simultaneously moved toward said columns and said supporting apparatus rendered inactive.

2. A support for demountable bodies, comprising a base, pairs of columns rigidly fixed in said base, toggle brackets, the members of which are carried on opposite sides of respective columns, a connecting member between the toggle brackets which lie on the same side of a pair of columns, each connecting member being adapted to supportingly engage a demountable body.

3. In a load handling apparatus, a base adapted to support a vehicle carrying a demountable body, a pair of uprights on opposite sides of said base, a bracket mechanism carried on each upright and adapted to be actively positioned over the base toward the opposite upright by vertical movement of the parts of the mechanisms to support the body above the base independently of the vehicle.

4. In a support for a demountable body, a base, columns fixedly mounted in said base respectively on opposite sides of the region to be occupied by said body, and toggles, the interconnected arms of which are respectively fixedly and slidably pivoted to respective columns, said toggles being movable toward each other and means carried at the toggle joint by one arm to engage and support a body when so moved.

5. A support for a demountable body, comprising a base, an upright column in said base, two toggle members pivoted together, means pivotally connecting the members to said column, a supporting means carried on one of said members and adapted to underlie a demountable body, said first-named means including abutments operatively engaging respective toggle members in a manner to limit the opening and closing of the toggles with respect to said supporting column.

6. The combination of two pairs of columns, two demarking respective opposite sides of a vehicle entry-way, toggle brackets normally extending from each column transversely of the entryway, each bracket being adapted to be moved in a vertical plane toward the column to become inactive, two rigid supporting members, each respectively associated with the brackets on one side of the entry-way, said supporting members being supported by said toggles to support in turn a demountable vehicle body in the entry-way.

7. In freight handling apparatus, uprights demarking opposite sides of an entry-way adapted to receive a vehicle carrying a demountable body, body supports movably carried on said uprights and adapted to be positioned by gravity into the entry-way in supporting relation to such demountable body, said supports being raisably movable to idle positions by operative engagement with a vehicle entering the entry-way.

8. The combination with uprights demarking opposite sides of a vehicle entry-way, a pair of toggles carried on each upright and adapted to be actively positioned to support the body independently of the vehicle, and means whereby the vehicle in entering the entry-way automatically moves said toggles to idle position.

9. In a support for a demountable body, comprising a base, an H-column fixed in said base, a pair of stirrups each at a different elevation on said H-column and carried on a common flange, a toggle bracket mechanism carried by said stirrups, and a member carried by said toggle bracket adapted to engage a demountable body.

10. In a support for a demountable body, comprising a base, a pair of columns fixed in said base, a pair of stirrups on each of said columns, one carried adjacent said base and the other a substantial distance thereabove, a toggle bracket on each column carried by said stirrups, and a common member connecting the two toggle brackets and adapted to engage a demountable body.

11. In a support for a demountable body, comprising a base, a column fixed on said base, vertically spaced stirrups on said column, an adjustable bracket adapted to supportingly engage a portion of such demountable body, said bracket comprising interconnected toggle links mounted on respective stirrups, a horizontal beam rigidly connected to one of said links and having a free end bent toward said column to provide a camming surface engageable by a vehicle moving past said column to adjust the bracket.

12. A support for a demountable body, comprising a base, a plurality of columns arranged to define the corners of a parallelogram on said base to thereby form an entry-way, each column having an upper stirrup with a vertical slideway and a lower stirrup, toggles having upper and lower links, pins pivotally retaining the upper links for operation in the upper stirrups and pins retaining the lower links in the lower stirrups, bracket devices on one of the links of each toggle adapted to operatively supportingly engage a body positioned between said columns and beams operatively connecting together the toggles that are on the same side of the entry-way so that the connected toggles move simultaneously.

13. A support for a demountable body comprising a pair of upright columns fixed in a base on each side of a vehicle area, pivotally interconnected toggle links mounted on respective columns, for horizontal displacement of the interconnected portions of the links away from the columns, a ledge device on one of the links of each toggle, adapted to be moved to a position underlying a demountable body when the interconnected portions are displaced horizontally as stated, and means for limiting the opening movement of the toggle to maintain the upper member inclined upwardly when the toggle is fully open, whereby the toggle may be straightened by a horizontal pushing movement against the common pivot of the links.

14. A support for a demountable body, comprising a base, a pair of columns fixed in said base in a manner to demark one side of a vehicle entry-way, a toggle bracket on each column adapted to move toward the entry-way, a beam connected to each toggle bracket, whereby the thus connected toggle brackets move simultaneously, an end portion of each beam extending outwardly with respect to said entry-way, whereby the beam may be engaged by a vehicle entering the entry-way and cammed toward the columns, and means on the other side of the entryway for supporting the body deposited on said beam.

RAGNAR A. NORBOM.